United States Patent [19]

Kalopissis

[11] 3,797,994
[45] Mar. 19, 1974

[54] HAIR COLORING COMPOSITIONS CONTAINING ORGANIC ACID ANHYDRIDE-DYE POLYMERS

[75] Inventor: Gregoire Kalopissis, Paris, France

[73] Assignee: Societe anonyme dite: L'Oreal, Paris, France

[22] Filed: Mar. 19, 1971

[21] Appl. No.: 126,349

Related U.S. Application Data

[63] Continuation-in-part of Ser. No. 576,839, Sept. 2, 1966, Pat. No. 3,617,165, which is a continuation-in-part of Ser. No. 523,525, Jan. 28, 1966, Pat. No. 3,619,101, which is a continuation-in-part of Ser. No. 227,542, Oct. 1, 1962, abandoned.

[52] U.S. Cl. ............................. 8/10.1, 8/10, 132/7, 260/78.4 R, 260/80 R, 424/DIG. 2, 424/71
[51] Int. Cl. ............................................. A61k 7/12

[58] Field of Search .................. 8/10, 10.1; 424/71

[56] References Cited
UNITED STATES PATENTS

| 2,632,004 | 3/1953 | Minsk et al. ........................ 260/152 |
| 2,732,382 | 1/1956 | Minsk et al. ..................... 260/152 X |
| 3,251,743 | 5/1966 | Hahn et al. ............................ 8/10.1 |
| 3,364,186 | 1/1968 | Wilhelm et al. ............. 260/80.75 X |

*Primary Examiner*—Stanley J. Friedman
*Assistant Examiner*—Vera C. Clarke
*Attorney, Agent, or Firm*—Cushman, Darby & Cushman

[57] ABSTRACT

This invention relates to hair dye compositions which comprise a solution of a colored polymer in a solvent selected from the group consisting of water, alcohol and their mixtures.

7 Claims, No Drawings

HAIR COLORING COMPOSITIONS CONTAINING ORGANIC ACID ANHYDRIDE-DYE POLYMERS

This application is a continuation-in-part of Ser. No. 576,839, filed Sept. 2, 1966, now U.S. Pat. No. 3,617,165, which in turn is a continuation-in-part of Ser. No. 523,525, filed Jan. 28, 1966, now U.S. Pat. No. 3,619,101, which in turn is a continuation-in-part of Ser. No. 227,542, filed Oct. 1, 1962, now abandoned.

This invention relates to a composition for treating live human hair and more particularly to a solution of a colored polymer and a solvent therefor wherein a dye is chemically bound to the polymer.

Heretofore, compositions for coloring hair included aqueous solutions, mixtures and dispersions containing a dye and a polymer. However, such compositions are considered generally unsatisfactory for a variety of reasons including principally their inability to provide a readily removable coloring material which would not dye the hair itself. Often the dye component of these prior art compositions would dye the hair and the dye component would often separate from the polymer portion during storage of the composition. Further, it was noticed that such prior art compositions exhibited a tendency to rub off on the skin or clothing, thus rendering them commercially unattractive.

The present invention, however, overcomes the disadvantages of such prior art compositions and provides a composition for treating live human hair which is readily removable therefrom and which does not actually dye the hair itself. Further, the easy removability characteristics of the composition of this invention is attributed to the water-solubility of the colored polymer employed to formulate the same, thus permitting its frequent use since the frequent application of other solvents to the hair could seriously deleteriously affect the same. Further, the present invention provides a composition containing a colored polymer prepared from a dye and a polymer wherein the quality of the dye is not impaired by chemical combination with the polymer. Additionally, it has been observed that the composition of this invention is essentially non-irritating to the skin.

The novel colored polymers of the present invention are characterized by the fact that they can be manufactured with a degree of consistency in their physical characteristics and colors, and that they have a particularly strong coloring effect since it is possible to attach a notably higher number of molecules of dye to the structural chain of the polymer than is the case with those colored polymers known up to the present time.

Due to this fact, the colored polymers of the present invention can be used very advantageously when mixed with colorless polymers which are chosen for their good cosmetic quality so as to impart to these colorless polymers a particular coloration. Because of the intensity of the coloring effect obtained with polymers of this type, the addition of small quantities thereof to colorless polymers is sufficient to produce the desired coloring effect without impairing the cosmetic qualities of the latter polymers.

The colored polymer of the present invention comprises a homopolymer to the macromolecular chain of which at least one amine dye is attached by a chemical bond of the amide type.

The term "colored homopolymer" is used in the present description to designate resins consisting of homopolymers to which dyes have been attached at certain places while other groups, for example, "alcohol" groups, can be attached at other places. In other words, the expression "colored homopolymer" thus signifies that the colored resin has been obtained from a homopolymer but not necessarily that the colored polymer taken as a chemical entity is itself a homopolymer, that is, that all its monomeric units are identical.

According to a preferred embodiment of this invention, the amine dye used to dye the homopolymer consists of an extra-nuclear amine dye in which the nitrogen of the extra-nuclear amine function is used to form the amide bond which binds the dye to the homopolymer.

In particular, there is employed a dye selected from the group consisting of azo, anthraquinone and benzene dyes containing an extra-nuclear radical having the formula:

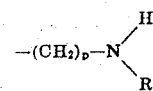

wherein:

$p$ is an integer between 2 and 6 inclusive, $R$ represents hydrogen, $-CH_3$, or $-C_2H_5$ with said radical being bonded to the aromatic nucleus of the dye through a nitrogen atom directly attached to said aromatic nucleus and said dye being bonded to the anhydride function of the polymer by an amide bond through the terminal nitrogen atom of said extra-nuclear radical.

Among the dyes having the above formula are those which have, in addition to the amine function which is used for the bond with the polymer, at least one other amine function, substituted directly on the ring.

Colored polymer as defined above may be mixed with colorless polymers such as a polyvinylpyrrolidone, having a nuclear weight of about 10,000 – 400,000, polyvinylpyrrolidone/vinyl acetate copolymers (70:30 to 30:70, and having a K value (1 percent ethanol solution) of about 25 to 50) or other colorless polymers of known types thereby producing a colored mixture particularly suitable for cosmetic use.

In particular, such colored resins can be used in the production of hair-setting lotions which, after the evaporation of the solvent or the diluting agent, leave a coating of resin on the hair. This permits the desired coloration to be obtained while fixing the shape of the coiffure.

Another object of the present invention is to provide the new industrial product which consists of a hair setting lotion essentially characterized by the fact that it contains at least one colored homopolymer as defined above in an aqueous alcohol solution and in the presence of a mineral or organic base thereby permitting the neutralization of the carboxyl acid functions of the homopolymer. Suitable bases include, for instance, 2-amino-2-methyl-1-propanol, and the pH of the hair setting lotion can range from about 6 to 9.

Setting lotions according to the invention can also contain other colorless resins utilized in cosmetics, or other colored resins, as well as the adjuvants generally used in cosmetics, such as perfumes, surface-active agents or penetrating or swelling agents. Preferably, the hair setting lotion contains 0.5 – 6 percent by weight of said colored homopolymer.

Specifically the present invention provides a composition for treating live human hair comprising a solution of a hair coloring amount of a colored polymer and a solvent therefor, said solvent being selected from the group consisting of water, an alcohol such as a lower alkanol and their mixtures containing, for instance, about 20–50 percent weight alcohol. The colored polymer comprises a semiester, semiamide of (1) an organic acid anhydride selected from the group consisting of poly(maleic anhydride) having a molecular weight ranging from about 2,000 to about 14,000, poly(itaconic anhydride) having a molecular weight ranging from about 2,000 to about 12,000, poly(acrylic anhydride) having a molecular weight ranging from about 4,000 to about 20,000, poly (methacrylic anhydride) having a molecular weight ranging from about 3,000 to about 15,000 and a poly(mixed acrylic/methacrylic anhydride) having a molecular weight ranging from about 2,000 to about 15,000, (2) a dye selected from the group consisting of azo, anthraquinone and benzene dyes containing an extra-nuclear radical having the formula

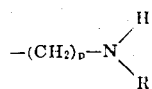

wherein R is selected from the group consisting of hydrogen, —CH₃ and —C₂H₅ and p is 2–6, the extra-nuclear radical being bonded to the aromatic nucleus of said dye through a nitrogen atom directly attached to said aromatic nucleus and said dye being bonded to the anhydride function of the polymer by an amide bond through the terminal nitrogen atom of said extra-nuclear radical, the quantity of dye combined with said polymer by amidification ranging between 68.4 – 100 percent of theoretical, and (3) a lower alkanol being bonded to the dye-free anhydride functions of the polymer, 2–25 percent of the anhydride functions of the polymer are condensed with the dye.

The following examples are provided to illustrate the invention.

EXAMPLE 1

Preparation of a colored mixed semi-ester semi-amide polymer by condensing on poly(maleic anhydride) both n-butyl alcohol and a dye having the formula:

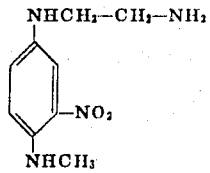

300 ml of anhydrous dioxane, 29.4 g (0.3 mols) of poly(maleic anhydride) having a molecular weight of 4,000, 6.3 g (0.03 mols) of a dye having the above formula and 20 g (0.27 mols) of n-butanol are placed in a flask equipped with agitating means, a thermometer and a reflux condenser. This is heated to reflux for 10 hours. Esterification is completed by adding 22.2 g (0.3 mols) of n-butanol and again heating to reflux for 7 hours.

The colored copolymer is then precipitated with petroleum ether. Drying yields 83 percent by weight of a violet powder which is soluble in alcohol and in an aqueous alcohol (ethanol) solution.

Analysis shows that the quantity of dye combined with the polymer by amidification is 82 percent of that theoretically possible.

EXAMPLE 2

Preparation of a colored mixed semi-ester semi-amide polymer by condensing on poly(itaconic anhydride) both n-butyl alcohol and a dye having the formula:

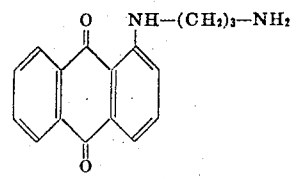

33.6 g (0.3 mols) of poly(itaconic anhydride) having a molecular weight of 3,000, 200 g of anhydrous dioxane, 4.2 g (0.015 mols) of dye having the above formula and 21 g (0.285 mols) of n-butanol are placed in a flask equipped with agitating means, a thermometer and a reflux condenser. The mixture is heated to reflux for 15 hours. The esterification is completed by addition of 22.2 g (0.3 mol-g) of n-butanol and it is again heated to reflux for 7 hours.

The colored copolymer is then precipitated with petroleum ether. Drying yields 79.5 percent by weight of a red powder, which is soluble in alcohol and an aqueous alcohol mixture.

It is found by analysis that 100 percent of the theoretically possible quantity of dye is bonded to the polymer by amidification.

EXAMPLE 3

Preparation of a colored mixed semi-ester semi-amide polymer by condensing on poly(acrylic anhydride) both n-butyl alcohol and a dye having the formula:

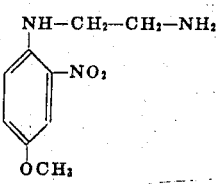

37.8 g (0.3 mol-g) of poly(acrylic anhydride) having a molecular weight of 14,000, 200 g of anhydrous dioxane, 3.165 g (0.015 mol-g) of dye having the above formula and 21 g (0.285 mol-g) of n-butanol are placed in a flask equipped with agitating means, a thermometer and a reflux condenser.

The mixture is heated to reflux for 12 hours. Esterification is completed by the addition of 22.2 g (0.3 mol-g) of n-butanol and it is again heated to reflux for 8 hours.

The colored copolymer is then precipitated with petroleum ether. After drying, an orange-yellow powder is obtained. The yield is 82 percent by weight. This powder is soluble in alcohol, for instance, ethanol or isopropanol and in an aqueous alcohol mixture.

It is found by analysis that the quantity of dye bonded to the polymer by amidification is 100 percent of that theoretically possible.

EXAMPLE 4

Preparation of a colored mixed semi-ester semi-amide polymer by condensing on poly(methacrylic anhydride) both n-butyl alcohol and a dye having the formula:

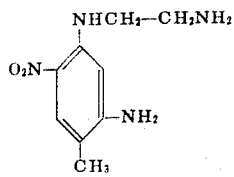

46 g (0.3 mol-g) of poly(methacrylic anhydride) having a molecular weight of 7,100, 200 g of anhydrous dioxane, 3.15 g (0.015 mol-g) of a dye having the above formula and 21 g (0.285 mol-g) of n-butanol are placed in a flask equipped with agitating means, a thermometer and a reflux condenser.

The mixture is heated to reflux for 15 hours. Esterification is completed by adding 22.2 g (0.3 mol-g) of n-butanol and it is again heated to reflux for 7 hours.

The colored copolymer is then precipitated with petroleum ether. After drying the yield is 71.5 percent by weight of a yellow powder which is soluble in a lower alkanol such as ethanol or isopropanol and in an aqueous alcohol mixture.

It is found by analysis that the quantity of dye bonded to the polymer by amidification is 100 percent of that theoretically possible.

EXAMPLE 5

Preparation of a colored mixed semi-ester semi-amide polymer by condensing on a poly(mixed acrylic/methacrylic anhydride) both n-butyl alcohol and a dye having the formula:

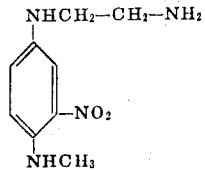

42 g (0.3 mol) of poly(acrylic/methacrylic anhydride) having a molecular weight of 6,500, 200 g of dioxane, 3.15 g (0.015 mol) of a dye having the above formula and 21 g (0.285 mol) of n-butanol are placed in a flask equipped with agitating means, a thermometer and a reflux condenser.

The mixture is heated to reflux for 15 hours. Esterification is completed by the addition of 22.2 g (0.3 mol) of n-butanol and it is again heated to reflux for 7 hours.

The colored copolymer is then precipitated with petroleum ether. Drying yields 76 percent by weight of a red violet powder which is soluble in an alcohol such as ethanol or isopropanol and in an aqueous alcohol solution.

It is found by analysis that the quantity of dye bonded to the polymer by amidification is 68.4 percent of that theoretically possible.

Examples 1–5 are repeated using instead dyes having the following formulae:

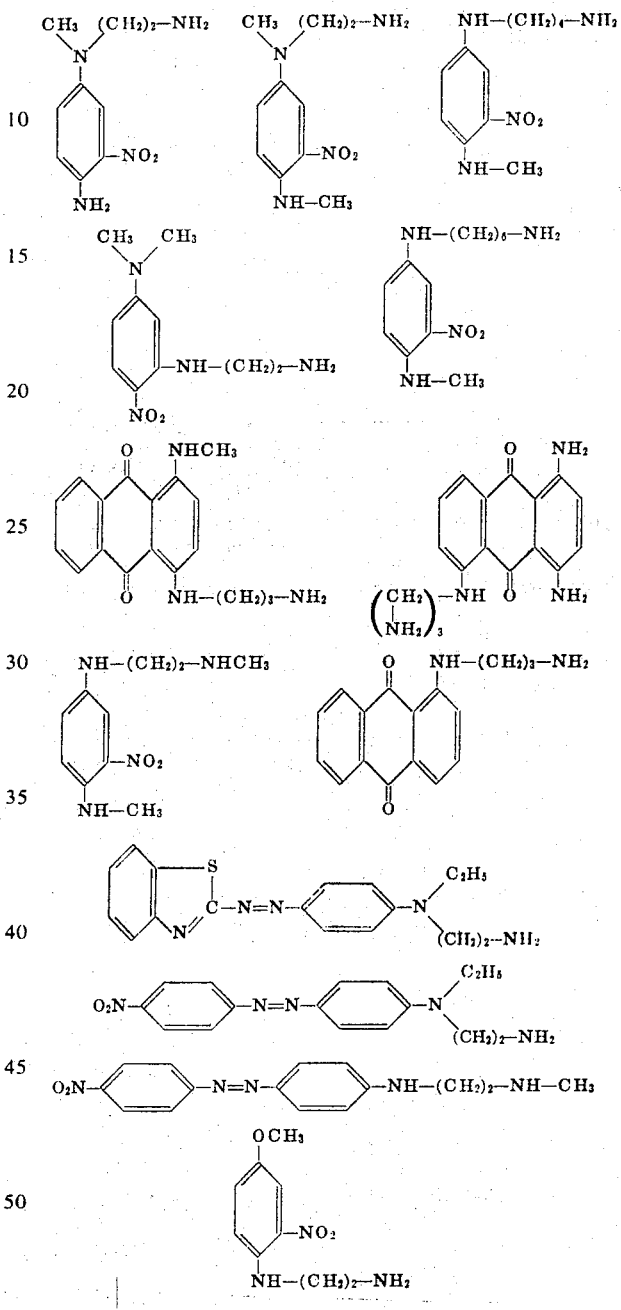

EXAMPLE 6

A hair setting lotion in accordance with the present invention is prepared by mixing together:

| | |
|---|---|
| Polymer obtained as in Example 1 | 2 g |
| 2-amino-2-methyl-1-propanol q.s.p. | pH 8.5 |
| Ethyl alcohol q.s.p. | 50° |
| Water q.s.p. | 100 ml. |

This solution is applied to brown hair which has previously been shampooed and the hair is set in the usual manner.

When the hair is dried and arranged it has a violine mahogany shade.

EXAMPLE 7

Another hair setting lotion according to the invention is prepared by admixing:

| | |
|---|---|
| Polymer obtained as in Example 3 | 1.3 g |
| Polymer obtained as in Example 2 | 0.7 g |
| 2-amino-2-methyl-1-propanol q.s.p | pH 8 |
| Ethyl alcohol q.s.p. | 50° |
| Water q.s.p. | 100 ml |

This lotion is applied to chestnut or blond hair which has been dampened and dried and the hair is then set in the usual manner.

After drying, the hair shines and has golden glints.

EXAMPLE 8

A hair setting lotion according to the invention is prepared by mixing together:

| | |
|---|---|
| Polymer obtained as in Example 5 | 0.8 g |
| Polymer obtained as in Example 3 | 0.2 g |
| Grantrez AN 3953 (half butyl ester of Gantrez AN 119 which is methylvinylether/maleic anhydride copolymer having a specific viscosity of 0.1–0.5 in a 1% solution of the copolymer in methyl ethyl ketone at 25°C) | 1.5 g |
| 2-amino-2-methyl-1-propanol q.s.p | pH 8 |
| Ethyl alcohol q.s.p. | 50° |
| Water q.s.p. | 100 ml |

This solution is applied to natural warm chestnut hair and the hair is then set.

After drying, the hair is strong and shiny with mahogany glints.

Essentially similar hair setting lotions are prepared using polymers prepared as in Example 4 as well as polymers prepared using the such other dyes listed above.

What is claimed is:

1. A composition for treating live human hair comprising a solution of a hair coloring amount of a colored polymer and a solvent therefor, said solvent being selected from the group consisting of water, alcohol and their mixtures, said polymer comprising a semiester, semi-amide of (1) an organic acid anhydride selected from the group consisting of poly(maleic anhydride) having a molecular weight ranging from about 2,000 to about 14,000, poly(itaconic anhydride) having a molecular weight ranging from about 2,000 to about 12,000, poly(acrylic anhydride) having a molecular weight ranging from about 4,000 to about 20,000, poly(methacrylic anhydride) having a molecular weight ranging from about 3,000 to about 15,000 and poly(mixed acrylic/methacrylic anhydride) having a molecular weight ranging from about 2,000 to about 15,000, (2) a dye selected from the group consisting of azo, anthraquinone and benzene dyes containing an extra-nuclear radical having the formula

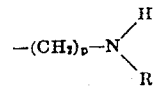

wherein R is selected from the group consisting of hydrogen, $-CH_3$ and $-C_2H_5$ and p is 2–6, said extra-nuclear radical being bonded to the aromatic nucleus of said dye through a nitrogen atom directly attached to said aromatic nucleus and said dye being bonded to the anhydride function of the polymer by an amide bond through the terminal nitrogen atom of said extra-nuclear radical, the quantity of said dye combined with said polymer by amidification ranging between 68.4–100 percent of theoretical, and (3) an alcohol selected from the group consisting of butanol and ethanol, said alcohol being bonded to dye-free anhydride functions of the polymer, 2–25 percent of said anhydride functions being condensed with said dye.

2. The composition of claim 1 wherein said organic acid anhydride is poly(maleic anhydride).

3. The composition of claim 1 wherein said organic acid anhydride is poly(itaconic anhydride).

4. The composition of claim 1 wherein said organic acid anhydride is poly(maleic anhydride).

5. The composition of claim 1 wherein said organic acid anhydride is poly(acrylic anhydride).

6. The composition of claim 1 wherein said organic acid anhydride is poly(acrylic/methacrylic anhydride).

7. The composition of claim 1 wherein said solvent is an aqueous alcohol solution containing about 20 – 50 weight percent alcohol and said colored polymer is present in amounts ranging from about 0.5 – 6 weight percent of said composition.

* * * * *

UNITED STATES PATENT OFFICE
CERTIFICATE OF CORRECTION

Patent No. 3,797,994           Dated  March 19, 1974

Inventor(s) Gregoire Kalopissis

It is certified that error appears in the above-identified patent and that said Letters Patent are hereby corrected as shown below:

In the Heading:

Foreign Application Priority Data

| | | |
|---|---|---|
| October 5, 1961 | France | 875,144 |
| May 13, 1965 | Luxembourg | 48,591 |
| September 6, 1965 | Luxembourg | 49,441 |
| January 10, 1966 | Luxembourg | 50,228 |
| June 14, 1966 | Luxembourg | 51,325 |
| June 16, 1966 | Luxembourg | 51,345 |
| April 20, 1966 | France | 58,324 |

Signed and sealed this 17th day of September 1974.

(SEAL)
Attest:

McCOY M. GIBSON JR.
Attesting Officer

C. MARSHALL DANN
Commissioner of Patents